(12) United States Patent
Zhang et al.

(10) Patent No.: US 8,991,190 B2
(45) Date of Patent: Mar. 31, 2015

(54) FUEL NOZZLE STAGING WITH WATER FLOWING PRIOR TO FUEL IN A MAIN FUEL CIRCUIT DURING START-UP

(75) Inventors: Hua Zhang, Greer, SC (US); Douglas Frank Beadie, Greer, SC (US); Gregory Allen Boardman, Greer, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 13/362,059

(22) Filed: Jan. 31, 2012

(65) Prior Publication Data

US 2013/0192236 A1      Aug. 1, 2013

(51) Int. Cl.
*F02C 7/26*      (2006.01)

(52) U.S. Cl.
USPC ............ 60/778; 60/776; 60/734; 60/775; 60/741; 60/39.094

(58) Field of Classification Search
CPC .......... F02C 7/236; F02C 3/30; F23K 5/14; F23K 5/04; F23K 5/12; F23K 5/147; F23K 2301/103; F23N 2027/04; F23D 2900/00016
USPC .......... 60/39.094, 39.281, 39.463, 39.3, 734, 60/740, 742, 773, 775, 741, 776, 39.826, 60/39.58, 778, 39.464; 137/8, 13, 14; 431/6; 44/301
See application file for complete search history.

(56) References Cited

U.S. PATENT DOCUMENTS

| | | | |
|---|---|---|---|
| 5,175,994 A * | 1/1993 | Fox et al. ................ | 60/39.58 |
| 5,344,306 A | 9/1994 | Brown et al. | |
| 6,209,310 B1 * | 4/2001 | Kuenzi et al. ............ | 60/775 |
| 6,256,975 B1 * | 7/2001 | Dobbeling et al. ........ | 60/776 |
| 6,715,295 B2 * | 4/2004 | Gadde et al. ............. | 60/775 |
| 7,610,745 B2 * | 11/2009 | Fujii et al. ............... | 60/39.27 |
| 2010/0058770 A1 * | 3/2010 | Ryan ........................ | 60/776 |
| 2010/0186366 A1 * | 7/2010 | Doyle et al. .............. | 60/39.53 |
| 2013/0097991 A1 * | 4/2013 | Zhang et al. ............. | 60/39.59 |
| 2013/0098040 A1 * | 4/2013 | Zhang et al. ............. | 60/734 |

* cited by examiner

*Primary Examiner* — William H Rodriguez
*Assistant Examiner* — Alain Chau
(74) *Attorney, Agent, or Firm* — Cantor Colburn LLP (57) ABSTRACT

A method for transferring fuel includes flowing water to at least one nozzle of a main fuel circuit. Also included is flowing oil to the at least one nozzle of the main fuel circuit. Further included is flowing liquid fuel to the at least one nozzle of the main fuel circuit, wherein flowing water to the at least one nozzle of the main fuel circuit occurs prior to flowing oil to the at least one nozzle of the main fuel circuit and flowing liquid fuel to the at least one nozzle of the main fuel circuit.

16 Claims, 7 Drawing Sheets

FUEL NOZZLE STAGING WITH WATER FLOWING PRIOR TO FUEL IN A MAIN FUEL CIRCUIT DURING START-UP

BACKGROUND OF THE INVENTION

The subject matter disclosed herein relates to turbine engines, and more particularly to a method for transferring fuel for a turbine liquid fuel system.

For large gas turbines, a combustion system typically employs multiple cans that are arranged circumferentially, with combustible fuel being delivered to each can for combustion. In order to produce sufficient combustion, the liquid fuel is often injected through a nozzle with atomization air assistance. If the atomization air is not used, the nozzle itself will be the atomizer. In this case, the combustion efficiency is related to the nozzle tip pressure drop. To ensure a high nozzle tip pressure drop, the combustion system typically employs two different fuel circuits, such as a pilot and a main, for example, because the fuel flow range from light off to base load is rather large. For dual orifice liquid fuel combustion systems, it is desirable to maintain a high tip pressure drop for each nozzle in the combustion system. Often, this requirement can be a challenge when the system transfers oil from the pilot circuit to the main circuit. During the transfer, some of the main nozzles do not have a pressure drop due to gravity head, which may hinder fuel flow.

BRIEF DESCRIPTION OF THE INVENTION

According to one aspect of the invention, a method for transferring fuel includes flowing water to at least one nozzle of a main fuel circuit. Also included is flowing oil to the at least one nozzle of the main fuel circuit. Further included is flowing liquid fuel to the at least one nozzle of the main fuel circuit, wherein flowing water to the at least one nozzle of the main fuel circuit occurs prior to flowing oil to the at least one nozzle of the main fuel circuit and flowing liquid fuel to the at least one nozzle of the main fuel circuit.

According to another aspect of the invention, a method for transferring fuel includes providing a pilot fuel circuit and a main fuel circuit to a combustion system, wherein the pilot fuel circuit and the main fuel circuit each comprise at least one nozzle. Also included is flowing pilot oil to the at least one nozzle of the pilot fuel circuit. Further included is flowing water to the at least one nozzle of the main fuel circuit. Yet further included is turning on the main fuel circuit, ramping up the main fuel circuit to a fixed position, and ramping down the pilot fuel circuit to a fixed position in about 10 seconds to about 40 seconds.

According to yet another aspect of the invention, a method for transferring fuel includes pre-filling a pilot manifold and a main manifold with oil. Also included is flowing oil to a plurality of nozzles of a pilot fuel circuit and ramping up a pilot control valve to about 80% to about 90% valve stroke. Further included is flowing water to a plurality of nozzles of a main fuel circuit. Yet further included is flowing oil to the plurality of nozzles of the main fuel circuit and ramping down the pilot fuel circuit. The method also includes flowing water to the plurality of nozzles of the pilot fuel circuit and operating under base load conditions.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
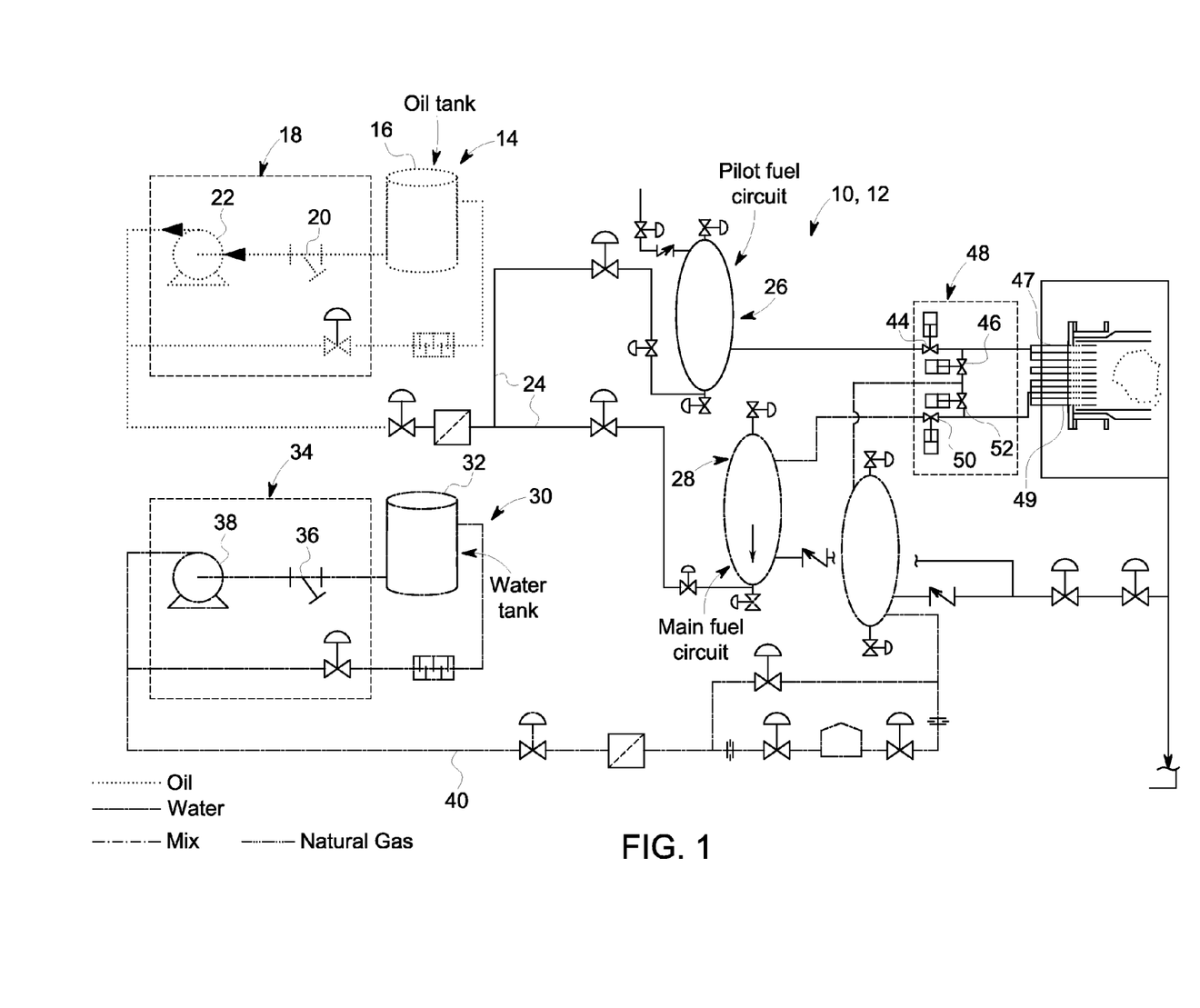
FIG. 1 is a flow diagram for a gas turbine liquid fuel system at a first stage of start-up.

FIG. 1 schematically illustrates a test set-up flow diagram for a gas turbine system 10. Specifically, the gas turbine system 10 comprises a liquid fuel system 12 that is capable of transporting various fluids, such as oil, water, nitrogen, natural gas, and/or an emulsion. These are merely exemplary fluids that the liquid fuel system 12 is configured to operate with, and it is conceivable that other fluids may be employed within the liquid fuel system 12.

The liquid fuel system 12 includes an oil source 14 comprising an oil tank 16 operably connected to an oil pump skid 18. The oil pump skid 18 includes an oil filter 20 and an oil centrifugal pump 22. The oil source 14 includes a plurality of oil lines 24 that operably connect the oil source 14 to a pilot fuel circuit 26 and a main fuel circuit 28, with each of the plurality of oil lines 24 containing various valves and flow meters to monitor and regulate flow within the plurality of oil lines 24. The liquid fuel system 12 also includes a water source 30 comprising a water tank 32 operably connected to a water pump skid 34. The water pump skid 34 includes a water filter 36 and a water centrifugal pump 38. The water flowing from the water source 30 is typically demineralized water, but other types of water may be employed. The water source 30 includes at least one water line 40 that operably connects the water source 30 to the pilot fuel circuit 26 and/or the main fuel circuit 28, with the at least one water line 40 containing various valves, flow meters, and possibly other components to monitor and regulate flow within the at least one water line 40.

The pilot fuel circuit 26 comprises at least one pilot manifold (not illustrated), at least one pilot oil control valve 44, at least one pilot water valve 46, and at least one nozzle 47 through which combustible fuel may be transferred. Similarly, the main fuel circuit 28 comprises at least one main manifold (not illustrated), at least one main oil control valve 50, at least one main water valve 52, and at least one nozzle 49 through which combustible fuel may be transferred. A mixing valve 48 is configured to deliver a mixture that includes combustible fuel to a combustor can (not illustrated).

Still referring to FIG. 1, one aspect of the invention provides a method for operating the liquid fuel system 12 of the gas turbine system 10. Specifically, a start-up method for the liquid fuel system initially includes starting various pumps, including the oil centrifugal pump 22 and the water centrifugal pump 38, as well as draining the main manifold of any water present. Subsequently, the main and pilot manifolds are each pre-filled with oil.

Figure 2:
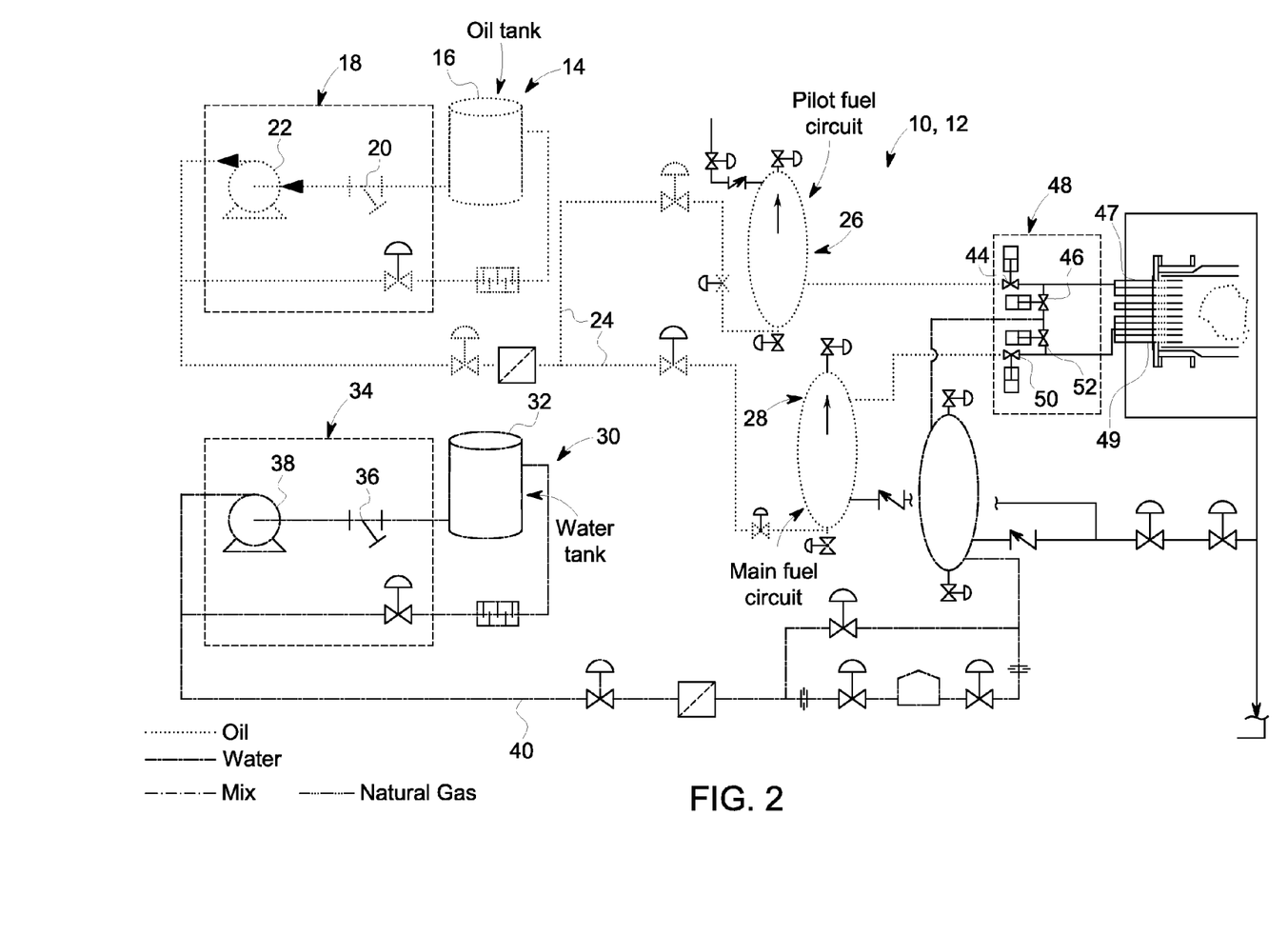
FIG. 2 is a flow diagram for a gas turbine liquid fuel system at a second stage of start-up.

Referring to FIG. 2, the at least one, but typically a plurality of nozzles 47 associated with the pilot fuel circuit 26 begin to receive oil flow at a fixed valve position in order to facilitate light off flow.

Figure 3:
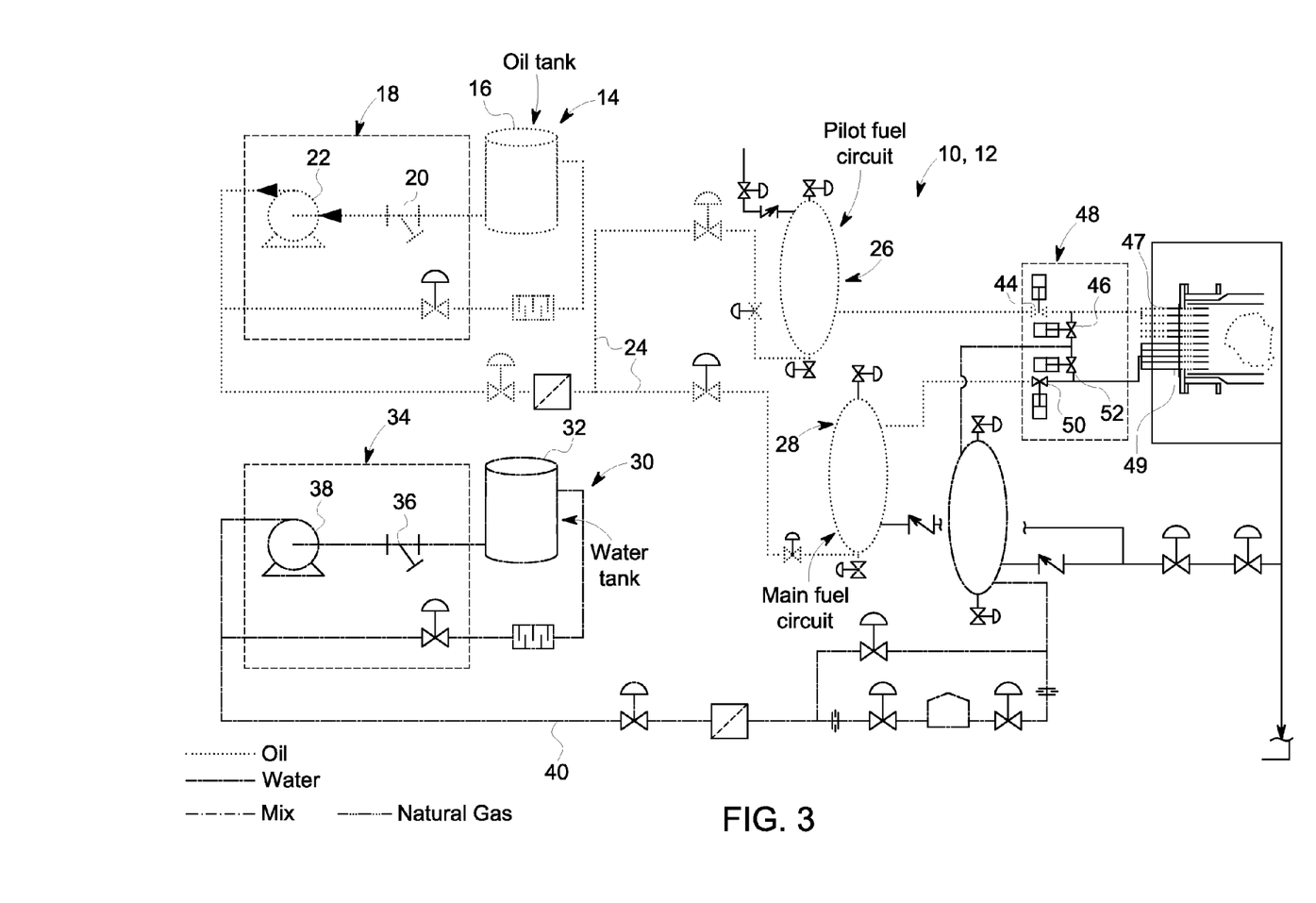
FIG. 3 is a flow diagram for a gas turbine liquid fuel system at a third stage of start-up.

Referring to FIG. 3, the oil flow through the pilot oil control valve 44 of the pilot fuel circuit 26 may then be switched to flow control and ramped up to about 80% to about 90% valve stroke.

Figure 4:
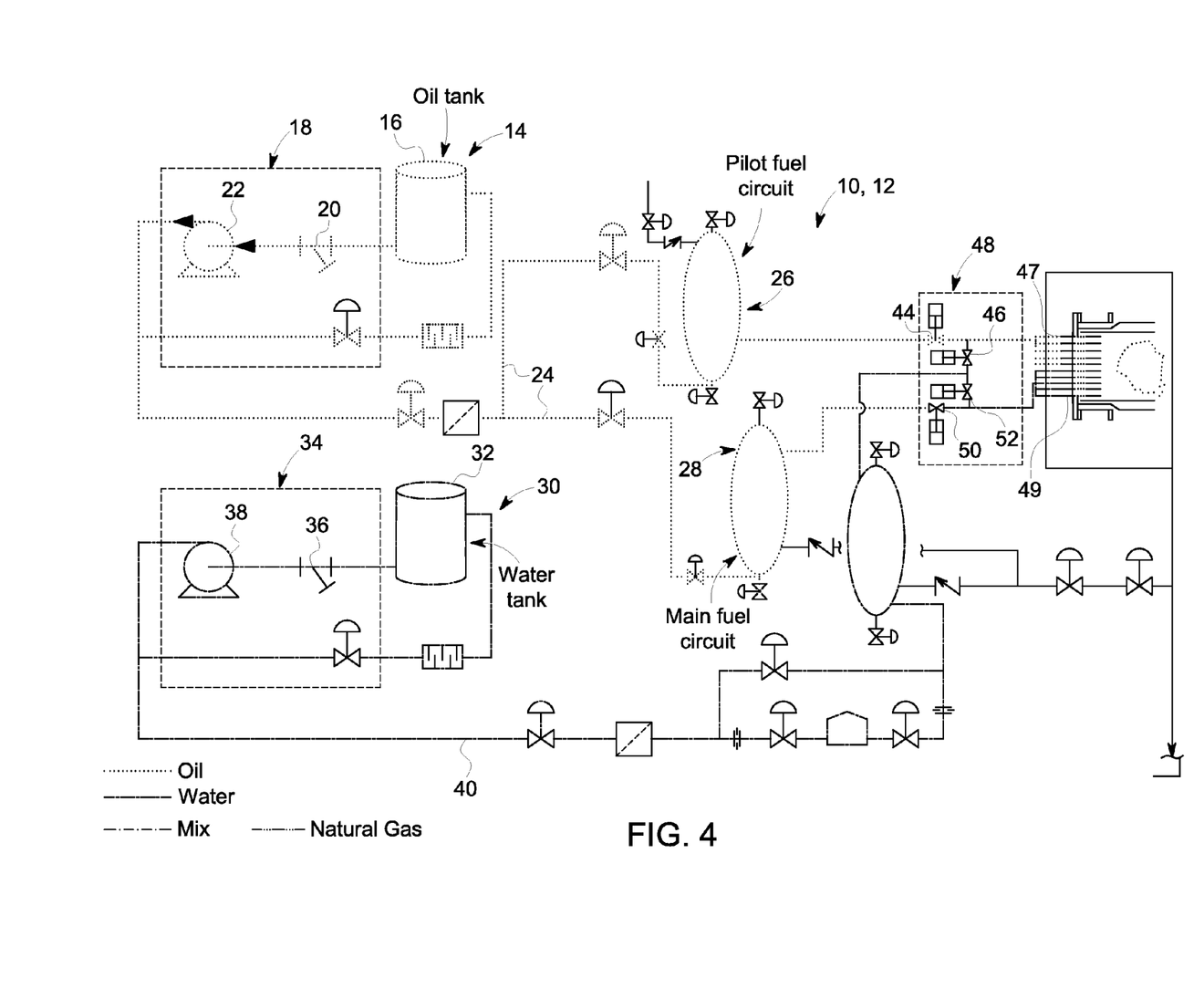
FIG. 4 is a flow diagram for a gas turbine liquid fuel system at a fourth stage of start-up.

Referring to FIG. 4, the main water valve 52 may be opened in order to initiate water flow to the at least one, but typically a plurality of nozzles 49 of the main fuel circuit 28. The water flow to the at least one nozzle 49 may last for about five (5) to about ten (10) seconds. Flowing water to the at least one nozzle 49 of the main fuel circuit 28 protects the nozzle 49 from undesirable effects associated with initial oil flow thereto, such as coking buildup, for example.

Figure 5:
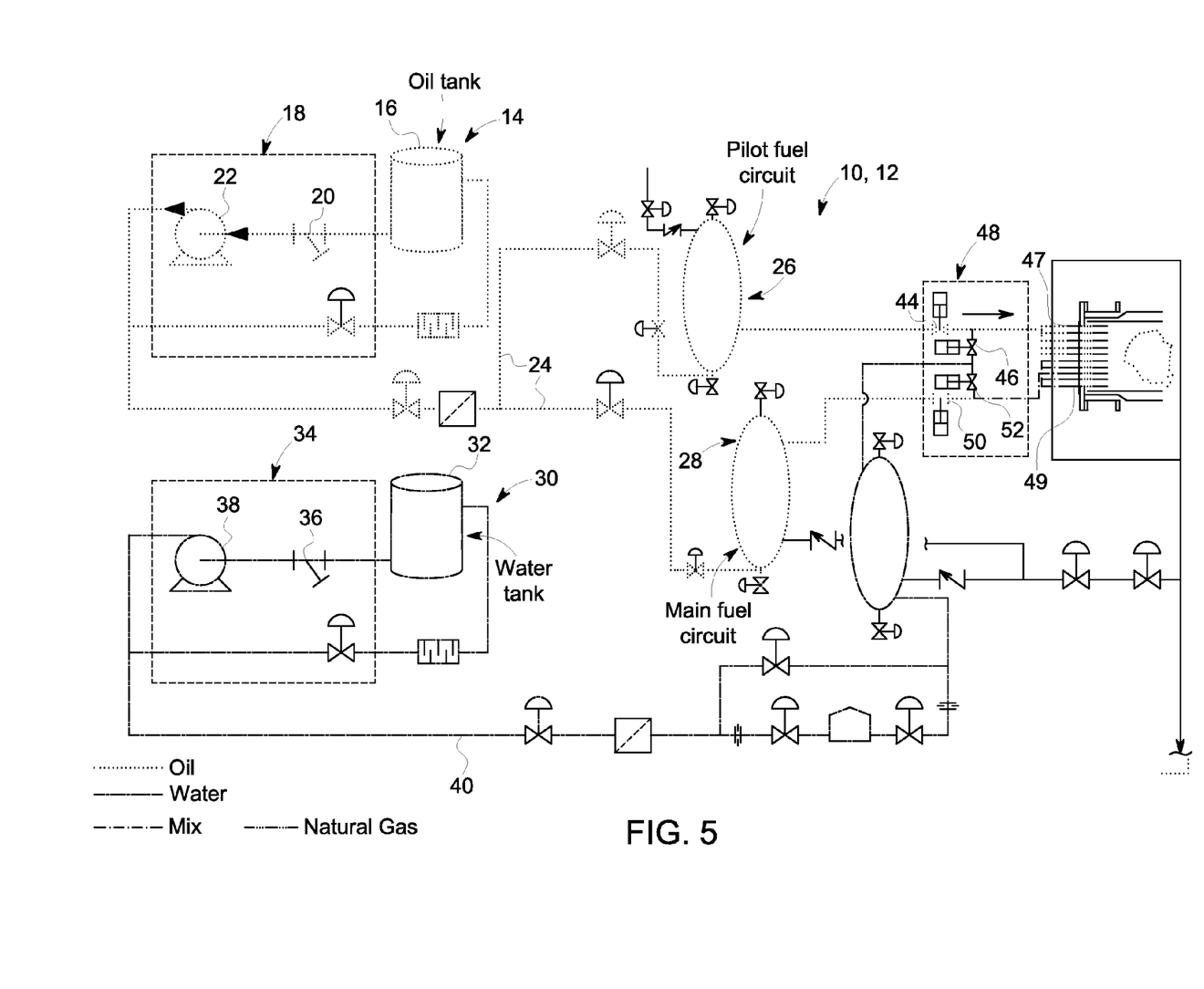
FIG. 5 is a flow diagram for a gas turbine liquid fuel system at a fifth stage of start-up.

Referring to FIG. 5, once the main fuel circuit 28 nozzle 49 has been provided with water, oil may begin to flow to the main fuel circuit 28, thereby resulting in the provision of fuel to the nozzle 49 of the main fuel circuit 28. The main oil control valve 50 is set at a fixed position and the pilot oil control valve 44 is ramped down to a fixed position in a timeframe of from about 10 seconds to about 40 seconds, depending on the application.

Figure 6:
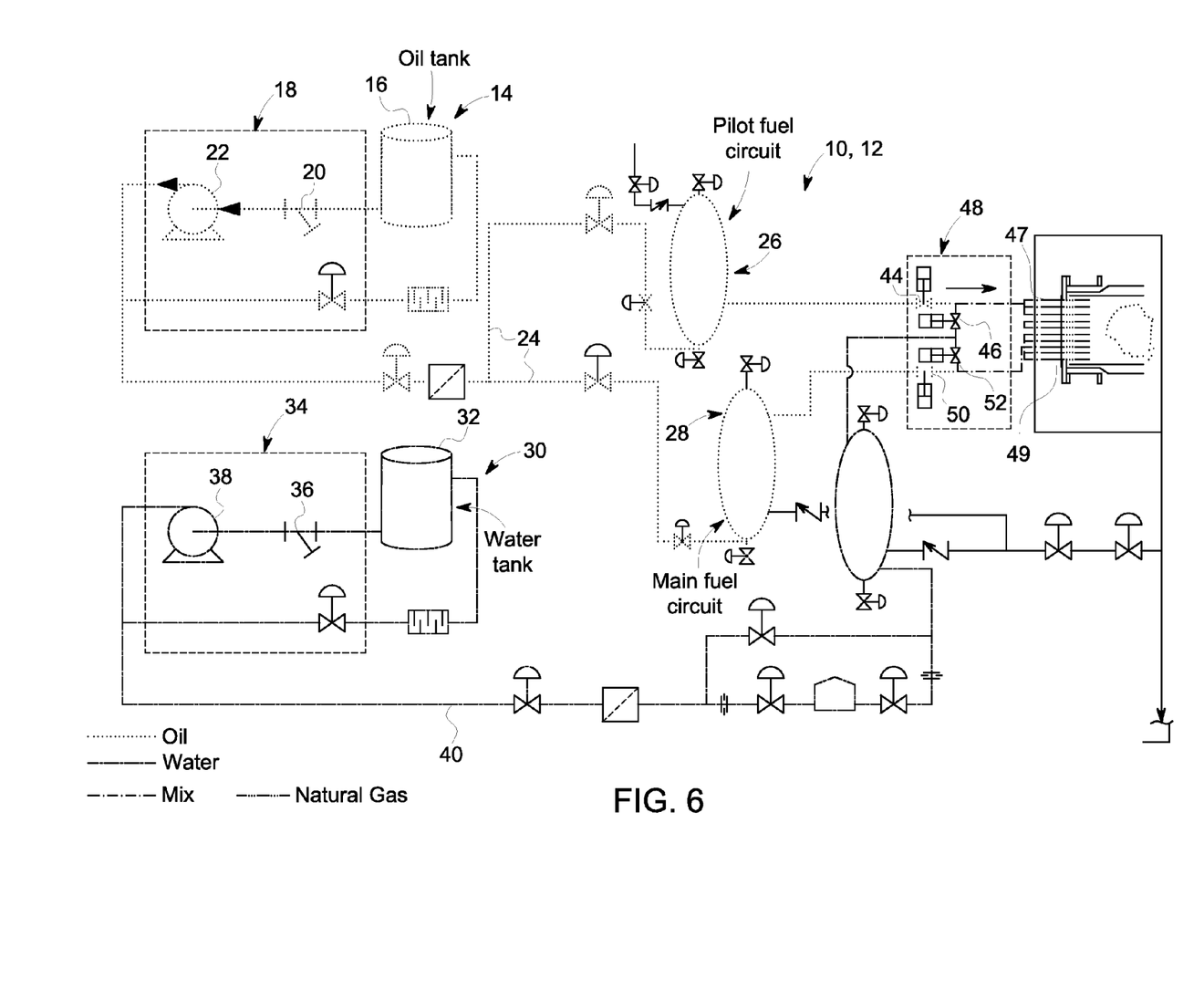
FIG. 6 is a flow diagram for a gas turbine liquid fuel system at a sixth stage of start-up.

Referring to FIG. 6, the main oil control valve 50, the pilot oil control valve 44, and the main water valve 52 are switched to flow control and ramped up until system load conditions of about 50% to about 60% are satisfied, however, typically about a 60% load will be met. Once this load condition is attained, water flows to the pilot fuel circuit 26 by opening of the pilot water valve 46. The fuel and water flow continue to ramp up toward full load, with a desired water/oil ratio of about in the range of about 0.9 to about 1.4. The system then operates at base load.

Figure 7:
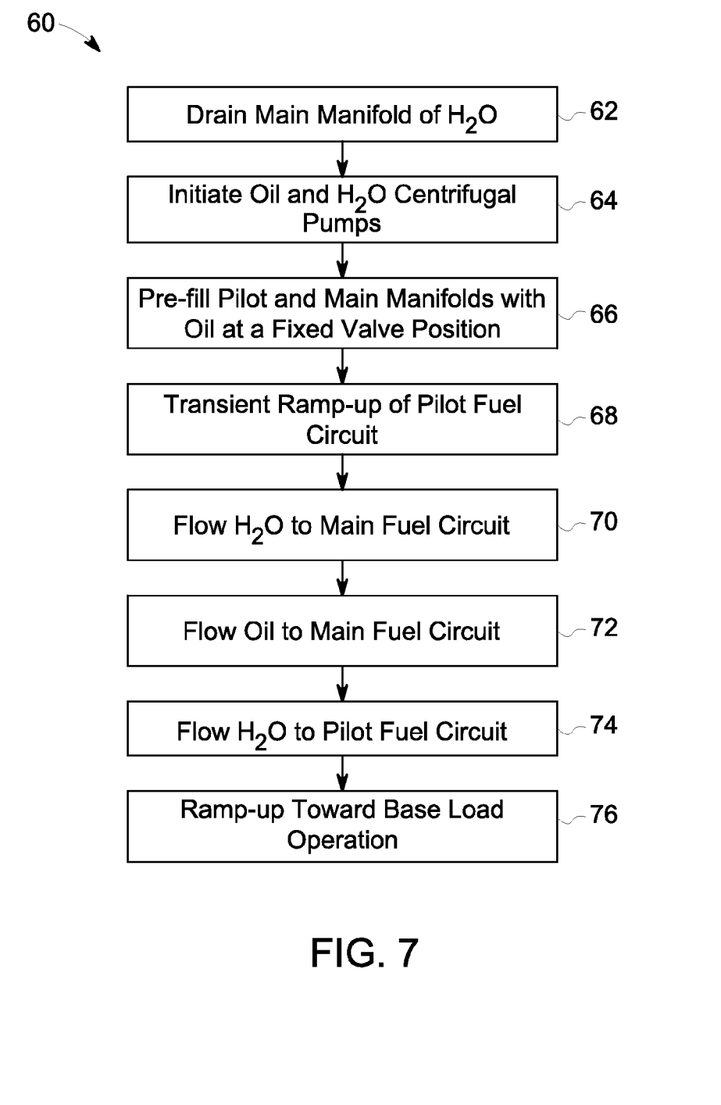
FIG. 7 is a flowchart illustrating a method for operating the gas turbine liquid fuel system.

Referring to FIG. 7, the method for transferring fuel is described in conjunction with the illustrated flowchart, the method being generally referred to as 60. Specifically, a startup sequence comprises draining the main manifold of water 62 and initiating the oil centrifugal pump and the water centrifugal pump 64. The pilot manifold of the pilot fuel circuit and the main manifold of the main fuel circuit are pre-filled with oil 66 at a flow resulting from a fixed valve position of the pilot oil control valve. Subsequent to light off, the fixed valve position of the pilot oil control valve is then switched to a flow control operation during a transient ramp up process 68 of the pilot fuel circuit. The transient ramp up process 68 continues in the flow control operation until reaching about 80% to about 90% valve stroke of the pilot oil control valve. At this point, the main water valve is opened to initiate water flow 70 to at least one nozzle of the main fuel circuit. The water flow to the at least one nozzle lasts for about five (5) to about ten (10) seconds. Subsequent to the provision of water to the at least one nozzle, oil flows to the main fuel circuit 72. The main oil control valve is set at a fixed position and the pilot oil control valve is ramped down to a fixed position in a timeframe of from about 10 seconds to about 40 seconds, thereby resulting in the pilot control valve reaching about 20% to about 35% valve stroke. The main oil control valve, the pilot oil control valve, and the main water valve are switched for flow control and ramped up until system load conditions of about 50% to about 60% are met, which may coincide with a main fuel flow rate of from about 14 lbs/second to about 35 lbs/second. Water then flows to the pilot fuel circuit 74 by opening of the pilot water valve. The fuel and water flow continue to ramp up toward full load 76, with a desired water/oil ratio of about 0.9 to 1.4. The system then is operated at base load.

Advantageously, the method enables the dual circuit, two stage design without requiring atomization air assistance, instead relying on the nozzles as atomizers. To this effort, the nozzles are protected from coking buildup that inhibits effective fuel transfer, thereby leading to more efficient combustion.

Although the method has been described in a series of steps, it is conceivable that the order and nature of the steps may be modified as needed, depending on the specific application of operation of the liquid fuel system 12 of the gas turbine system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for transferring fuel comprising:
   flowing water to at least one nozzle of a main fuel circuit during a start-up of a liquid fuel system until a 50% to 60% load operating condition occurs;
   flowing oil to the at least one nozzle of the main fuel circuit during the start-up of the liquid fuel system;
   wherein flowing water to the at least one nozzle of the main fuel circuit occurs prior to flowing oil to the main fuel circuit; and
   flowing oil to at least one nozzle of a pilot fuel circuit prior to flowing water to the at least one nozzle of the main fuel circuit.

2. The method for transferring fuel of claim 1, wherein flowing oil to the at least one nozzle of the pilot fuel circuit is conducted until a pilot control valve reaches 80% to 90% valve stroke.

3. The method for transferring fuel of claim 1, wherein flowing water to the at least one nozzle of the main fuel circuit is conducted over a time period of at least five (5) to ten (10) seconds, wherein flowing water occurs prior to flowing oil to the at least one nozzle of the main fuel circuit.

4. The method for transferring fuel of claim 1, wherein flowing oil to the at least one nozzle of the main fuel circuit further comprises ramping up the main fuel circuit to a fixed position of a main control valve and ramping down a pilot fuel circuit to a fixed position of a pilot control valve for 10 seconds to 40 seconds.

5. The method for transferring fuel of claim 4, wherein ramping down the pilot fuel circuit to a fixed position of the pilot control valve in 10 seconds to 40 seconds results in the pilot control valve reaching 20% to 35% valve stroke.

6. The method for transferring fuel of claim 1, wherein the 50% to the 60% load operating condition occurs at a main fuel flow rate of from 14 lbs/second to 35 lbs/second.

7. A method for transferring fuel comprising:
   providing a pilot fuel circuit and a main fuel circuit to a combustion system, wherein the pilot fuel circuit and the main fuel circuit each comprise at least one nozzle;

flowing pilot oil to the at least one nozzle of the pilot fuel circuit during a start-up of a combustion system until a 50% to 60% load operating condition occurs;

flowing water to the at least one nozzle of the main fuel circuit during the start-up of the combustion system until a 50% to 60% load operating condition occurs; and turning on the main fuel circuit, ramping up the main fuel circuit to a fixed position of a main control valve, and ramping down the pilot fuel circuit to a fixed position of a pilot control valve over a time period of 10 seconds to 40 seconds.

8. The method for transferring fuel of claim 7, wherein flowing pilot oil to the at least one nozzle of the pilot fuel circuit is conducted until the pilot control valve reaches 80% to 90% valve stroke.

9. The method for transferring fuel of claim 7, wherein flowing water to the at least one nozzle of the main fuel circuit is conducted for at least five (5) to ten (10) seconds prior to flowing oil to the at least one nozzle of the main fuel circuit.

10. The method for transferring fuel of claim 7, wherein turning on the main fuel circuit, ramping up the main fuel circuit to a fixed position of the main control valve and ramping down the pilot fuel circuit to a fixed position of the pilot control valve is conducted from 10 seconds to 40 seconds.

11. The method for transferring fuel of claim 7, wherein ramping down the pilot fuel circuit to a fixed position in 10 seconds to 40 seconds results in the pilot control valve reaching 20% to 35% valve stroke.

12. The method for transferring fuel of claim 7, wherein the 50% to 60% load operating condition occurs at a main fuel flow rate of from 14 lbs/second to 35 lbs/second.

13. A method for transferring fuel comprising:

pre-filling a pilot manifold and a main manifold with oil during a start-up of combustion system;

flowing oil to a plurality of nozzles of a pilot fuel circuit, ramping up a pilot control valve to 80% to 90% valve stroke during a start-up of the combustion system until a 50% to 60% load operating condition occurs;

flowing water to a plurality of nozzles of a main fuel circuit during a start-up of a liquid fuel system until a 50% to 60% load operating condition occurs;

flowing oil to the plurality of nozzles of the main fuel circuit and ramping down the pilot fuel circuit during the start-up of a liquid fuel system;

flowing water to the plurality of nozzles of the pilot fuel circuit during the start-up of the combustion system; and operating under base load conditions.

14. The method for transferring fuel of claim 13, wherein flowing water to the plurality of nozzles of the main fuel circuit is conducted over a time period of at least five (5) to ten (10) seconds, wherein flowing water occurs prior to flowing oil to the plurality of nozzles of the main fuel circuit.

15. The method for transferring fuel of claim 13, wherein flowing oil to the plurality of nozzles of the main fuel circuit and ramping down the pilot fuel circuit is conducted for at least 10 seconds.

16. The method for transferring fuel of claim 15, wherein ramping down the pilot fuel circuit in at least 10 seconds results in the pilot control valve reaching 20% to 35% valve stroke.

* * * * *